July 9, 1957
V. BOURQUE
2,798,521
EGG CUTTER
Filed Feb. 11, 1955
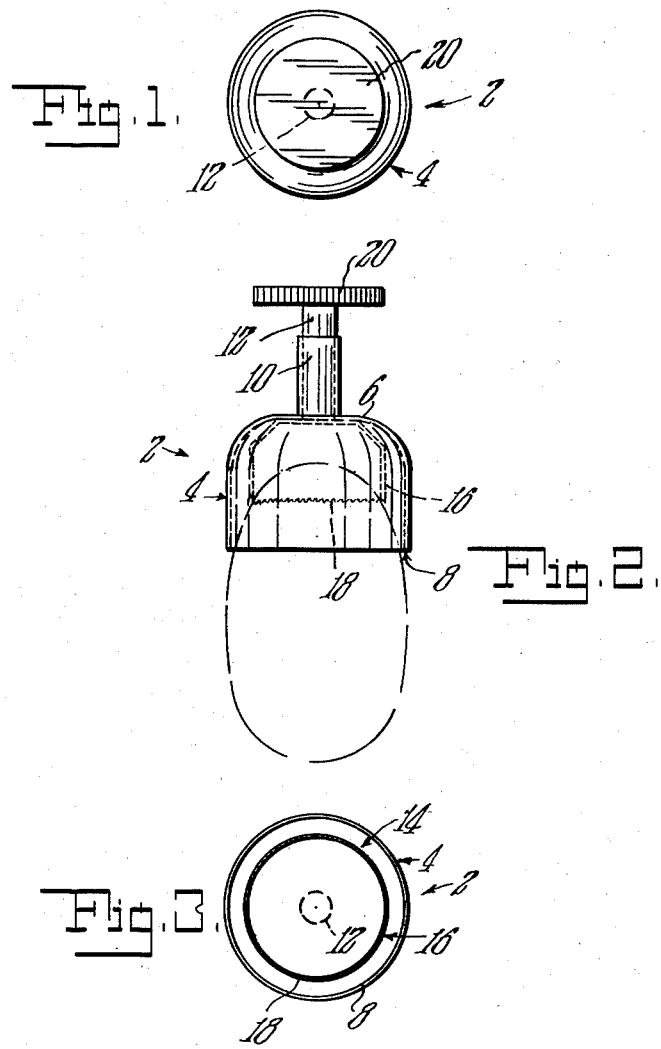
INVENTOR.
Valmore Bourque.
BY

United States Patent Office 2,798,521
Patented July 9, 1957

2,798,521

EGG CUTTER

Valmore Bourque, Holyoke, Mass.

Application February 11, 1955, Serial No. 487,539

1 Claim. (Cl. 146—2)

This invention relates to new and useful improvements in devices for cutting the shell of an egg to facilitate removal of the shell.

The principal object of the invention is directed to the provision of a device for cutting through the shell of an egg to facilitate the ready and easy removal of the shell.

The device of the invention is characterized by a support for resting on the egg and a cutter within and rotatable in the support for cutting the egg shell, with means for rotating the cutter.

All of the above cited objects, I accomplish by means of such structure and relative arrangement of parts thereof, as will fully appear by a perusal of the description below and by various specific features which will be hereinafter set forth. To these above and other ends and with the foregoing and various other and ancillary features and advantages and objects of my invention as will become more readily apparent as the description proceeds, my invention consists in certain novel features of construction, in a mode of operation, and in the combination organization and arrangement of parts as will be hereinafter more particularly pointed out in the claims hereunto annexed and more fully described and referred to in conjunction with the accompanying drawings wherein:

Fig. 1 is a plan view of an egg shell cutter device embodying the novel features of the invention;

Fig. 2 is a side elevational view of the device shown in Fig. 1; and

Fig. 3 is an inverted plan view of the device shown in Fig. 2.

In the accompanying drawing, I have illustrated a complete example of a physical embodiment of the invention in which the parts are combined and arranged in accordance with one mode which I have devised for the practical application of the principles of the invention.

It will, however, be understood that changes and alterations are contemplated and may be made in these exemplifying drawings and mechanical structures, within the scope of the claim, without departing from the principles of the invention.

Referring now to the drawing more in detail, the novel features of the invention will be described.

A support is shown at 2 which is in the form of a dome having side and upper walls 4 and 6.

The support may be formed from any material desired such as relatively thin metal, plastic or the like.

A lower annular peripheral rim 8 of the dome is adapted to engage and rest upon the upper end portion of an egg which in turn is suitably supported as by an egg cup or the like.

An elongated hollow bearing 10 is secured to and extends upwardly from the upper wall of the dome and is arranged to rotatably and slidably carry an elongated staff 12.

A cutter 14 in the form of a cup having a downwardly directed opening has a peripheral wall 16 provided with a lower annular cutting edge 18. Said cutting edge is formed by serrations or saw-like teeth. Said cutter will preferably be formed from relatively thin metal so as to provide a suitable cutting edge.

The cutter 14 is secured to the lower end of the staff 12 and a manually engageable member 20 is fixed to the upper end of said staff.

With the rim 8 of the member 2 resting on the upper portion of the shell of an egg, which is being supported in a suitable manner, the cutting edge 18 of the cutter is lowered onto the upper portion of the egg. The manually engageable member is grasped and rotated so as to rotate the cutting edge 18 on the egg shell.

More or less pressure is exerted on the cutter, as may be necessary, and the rotating cutter severs the shell adjacent the upper end of the egg to facilitate ready and easy removal of the shell.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claim are therefore intended to be embraced therein.

What it is desired to claim and secure by Letters Patent of the United States is:

A device for cutting the shell of an egg therearound inwardly of an end thereof comprising, a one-piece cylindrical supporting dome having an upper wall and an elongated side wall depending vertically therefrom disposed in parallelism with the longitudinal axis of said dome and provided with a lower annular rim at the lower end of said side wall for resting on the shell of an egg inwardly from the end thereof, an elongated bearing integral with and extending vertically upwardly from the upper wall having a vertical bore on the longitudinal axis of the dome, an elongated staff rotatable in said bore and being reciprocable therein between upper and lower positions, a disc-like member integral with the upper outer end of said staff having knurled manually engageable edge, a cylindrical cutter within and separate from the dome having an upper wall secured to the lower end of said staff and an elongated side wall depending vertically from said upper wall in parallelism with the side wall of the dome and provided on the lower edge of said side wall with cutting teeth, said cutter being of relatively less diameter than said dome and the upper wall thereof being arranged relative to said staff whereby the side wall and lower edge of the cutter are spaced inwardly of the side wall of the dome, in all positions of the cutter relative to the dome, and said disc like member and upper wall of the cutter being engageable with the upper end of the bearing and upper wall of the dome to limit reciprocating movements of said staff.

References Cited in the file of this patent

UNITED STATES PATENTS

| 1,491,908 | Grieg | Apr. 29, 1924 |

FOREIGN PATENTS

| 180,503 | Germany | Jan. 17, 1907 |
| 177,653 | Great Britain | Apr. 16, 1922 |
| 579,696 | Great Britain | Aug. 13, 1946 |